United States Patent
Aoyagi et al.

(10) Patent No.: US 11,290,036 B2
(45) Date of Patent: Mar. 29, 2022

(54) CONTROL DEVICE

(71) Applicant: Hitachi Automotive Systems, Ltd., Hitachinaka (JP)

(72) Inventors: Shigehisa Aoyagi, Tokyo (JP); Takafumi Hara, Tokyo (JP); Yoshitaka Sugiyama, Hitachinaka (JP); Masaki Kashima, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/975,610

(22) PCT Filed: Jan. 17, 2019

(86) PCT No.: PCT/JP2019/001347
§ 371 (c)(1),
(2) Date: Aug. 25, 2020

(87) PCT Pub. No.: WO2019/163341
PCT Pub. Date: Aug. 29, 2019

(65) Prior Publication Data
US 2020/0412284 A1    Dec. 31, 2020

(30) Foreign Application Priority Data

Feb. 26, 2018    (JP) .............................. JP2018-032569

(51) Int. Cl.
*H02P 29/024* (2016.01)
*H02P 6/12* (2006.01)
*H02P 6/16* (2016.01)

(52) U.S. Cl.
CPC . *H02P 6/12* (2013.01); *H02P 6/16* (2013.01)

(58) Field of Classification Search
CPC ........... H02P 6/12; H02P 6/16; H02P 29/0241
See application file for complete search history.

(56) References Cited

U.S. PATENT DOCUMENTS

| 2015/0069941 | A1* | 3/2015 | Iwaji ....................... H02P 6/183 318/400.11 |
| 2016/0233804 | A1* | 8/2016 | Furutani ............. H02P 29/0241 |
| 2018/0201303 | A1 | 7/2018 | Hara et al. |

FOREIGN PATENT DOCUMENTS

| JP | 2010-22196 A | 1/2010 |
| JP | 2017-17786 A | 1/2017 |

OTHER PUBLICATIONS

International Preliminary Report on Patentability (PCT/IB/338 & PCT/IB/373) issued in PCT Application No. PCT/JP2019/001347 dated Sep. 3, 2020, including English translation of document C2 (Japanese-language Written Opinion (PCT/ISA/237) previously filed on Aug. 25, 2020) (five (5) pages).

(Continued)

*Primary Examiner* — Cortez M Cook
(74) *Attorney, Agent, or Firm* — Crowell & Moring LLP (57) ABSTRACT

An applied voltage decision unit 510 performs in parallel, a process of determining three-phase AC commands V1$u$* to V1$w$* of a voltage applied to a motor by an inverter based on a position, of a rotor of a motor, detected by a position sensor with an output A, and a process of determining three-phase AC commands V2$u$* to V2$w$* of the voltage applied to the motor by the inverter based on a neutral point voltage VN of the motor. A PWM modulator 507 alternately outputs a PWM signal according to the three-phase AC commands V1$u$* to V1$w$* and a PWM signal according to the three-phase AC commands V2$u$* to V2$w$* to the inverter. A control device determines whether or not the position sensor with the output A has failed by comparing the position, of the rotor, detected by the position sensor with the output A with a position, of the rotor, estimated from a neutral point voltage VN of the motor.

11 Claims, 6 Drawing Sheets

(56) References Cited

OTHER PUBLICATIONS

International Search Report (PCT/ISA/210) issued in PCT Application No. PCT/JP2019/001347 dated Mar. 12, 2019 with English translation (two (2) pages).
Japanese-language Written Opinion (PCT/ISA/237) issued in PCT Application No. PCT/JP2019/001347 dated Mar. 12, 2019 (three (3) pages).

* cited by examiner

CONTROL DEVICE

TECHNICAL FIELD

The present invention relates to a control device.

BACKGROUND ART

An electric power conversion device such as an inverter controls current of a multi-phase rotating electric machine by a pulse width modulation (PWM). When the rotating electric machine is a three-phase motor, a three-phase winding current is controlled by comparing a voltage command value applied to the three-phase winding with a carrier signal that serves as a PWM reference to switch on and off of a switching element of a three-phase inverter. An output torque and a rotation speed of the three-phase motor are controlled so as to be desired values by the three-phase winding current.

In order to control the output torque, it is necessary to appropriately control the phase of the applied voltage, and for this purpose, it is necessary to accurately grasp the rotor position of the motor. A position sensor such as a resolver that detects a magnetic field from an exciting coil with a detection coil or a GMR that uses a highly sensitive magnetic sensor is used to detect the rotor position. In addition, redundant position sensors that can obtain two or more sensor outputs are being used in order to continue the driving even when the position sensor fails.

The failure output is determined by comparing the outputs of the position sensors in the failure determination of the redundant position sensor. However, when only two outputs are compared, it is possible to determine the failure, but it is difficult to identify the failed output. Therefore, it is required to identify the failure output by comparing three or more outputs.

The conventional example 1 described in Patent Literature 1 shows a problem in a defect of a position detection sensor of a motor driven control device. As a solution to this, a method of determining whether the position detection sensor is normal or abnormal during the inverter energization period, and performing the driving without being affected by an abnormal position sensor (method of detecting an abnormality of a position detection sensor) is described.

CITATION LIST

Patent Literature

PTL 1: JP 2010-22196 A

SUMMARY OF INVENTION

Technical Problem

In the conventional example 1, the description in which the motor is rotated without being affected by the output of the position sensor which is abnormal even when a defect occurs when using a Hall IC or a Hall element as a position sensor is disclosed. It is necessary to provide a minimum three Hall ICs or Hall elements in order to perform detection for 360 degrees every 120 degrees in electrical angle. The conventional example 1 discloses the description in which one of the three Hall ICs to be identified as a failure and the remaining two make it possible for the motor to continue its operation.

However, the position resolution is 60 degrees in electrical angle, which is lower than that of magnetic sensors such as the resolver and the GMR. Further, there is no disclosure of a technique for identifying a failure of a position sensor having a resolution of less than 60 degrees in electrical angle.

An object of the present invention is to provide a control device that can determine a failure of a position sensor by using a neutral point voltage of a motor.

Solution to Problem

In order to achieve the above purpose, the present invention includes an applied voltage decision unit that performs in parallel a process of determining, based on a position, of a rotor of a motor, detected by a first position sensor, a first command value of a voltage applied to the motor by an inverter, and a process of determining, based on a position, of the rotor, detected by a second position sensor or a neutral point voltage of the motor, a second command value of a voltage applied to the motor by the inverter, a modulator that alternately outputs, to the inverter, a first pulse width modulation signal according to the first command value and a second pulse width modulation signal according to the second command value, and a determination unit that determines whether or not the first position sensor has failed by comparing the position, of the rotor, detected by the first position sensor with a position, of the rotor, estimated from the neutral point voltage of the motor.

Advantageous Effects of Invention

According to the present invention, it is possible to determine the failure of the position sensor by using the neutral point voltage of the motor. Problems, configurations, and effects other than those described above will become apparent from the following description of embodiments.

DESCRIPTION OF EMBODIMENTS

Hereinafter, the details of the control devices according to the first to third embodiments of the present invention will be described with reference to the drawings. The control device controls an inverter that drives the motor.

First Embodiment

Figure 1:
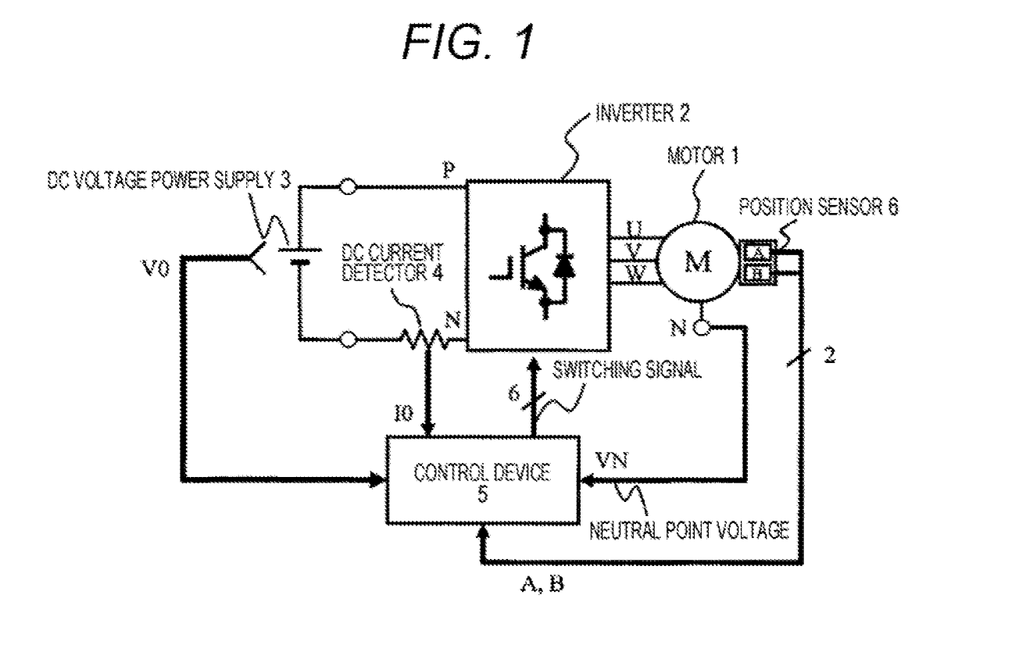
FIG. 1 is an overall configuration diagram of a first embodiment.

FIG. 1 shows an overall configuration diagram of a first embodiment of the present invention. A motor 1 shown in FIG. 1 has three-phase windings of U, V, and W and a neutral wire in which a neutral point N that is a connection point of the three phases is led. An inverter 2, having a switching element in each of the upper and lower arms of each phase, is composed of six elements, and is connected to each phase of U, V, and W of the motor 1, so that the voltage between PN that is the input of the inverter 2 is applied to each phase of the motor 1.

Figure 2:
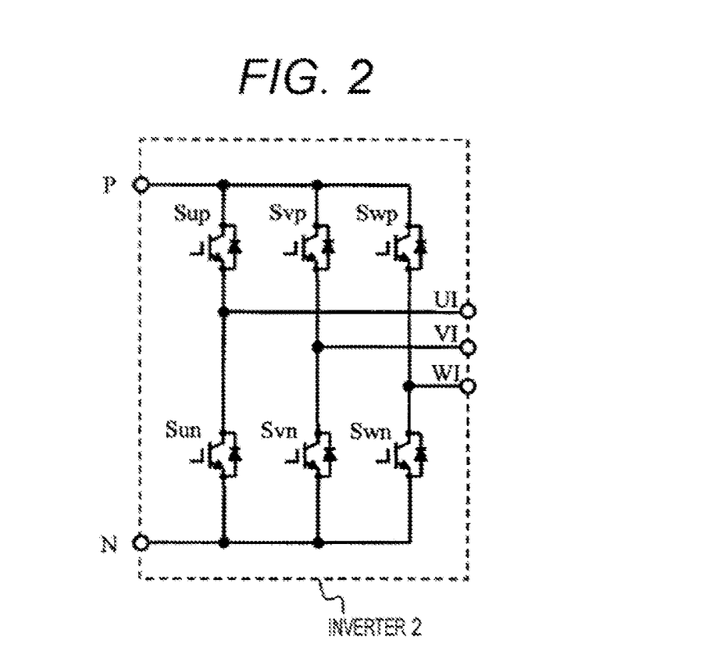
FIG. 2 is a diagram showing a circuit configuration of an inverter.

FIG. 2 shows the circuit configuration of the inverter 2. The inverter 2 includes an upper arm Sup and a lower arm Sun connected to the U-phase output UI, an upper arm Svp and a lower arm Svn connected to the V-phase output VI, and an upper arm Swp and a lower arm Swn connected to the W-phase output WI.

A DC voltage power supply 3 shown in FIG. 1 is composed of a battery, a DC/DC converter, or the like. In addition, while a rectifying element such as an electrolytic capacitor may be connected in parallel to a battery, etc. in order to stabilize the DC voltage and reduce the voltage ripple, in this embodiment, the DC voltage power supply 3 in the drawing includes the rectifying element. A DC current detector 4 detects the current of the motor 1 via the inverter 2 by adding the shunt resistor for protecting the inverter 2, and a DC current sensor separately from the shunt resistor. An AC current sensor may be added between the motor 1 and the inverter 2 for the same purpose.

The detection current I0 by the DC current detector 4 and the DC voltage V0 of the DC voltage power supply 3 are both input to a control device 5, and the switching timing of the inverter 2 is determined. Further, the control device 5 receives the sensor output of a position sensor 6 that detects the rotor position of the motor 1 and a neutral point voltage VN of the neutral point N. The control device 5 is, for example, a microcomputer, and includes a processor, a memory, and the like.

Figure 3:
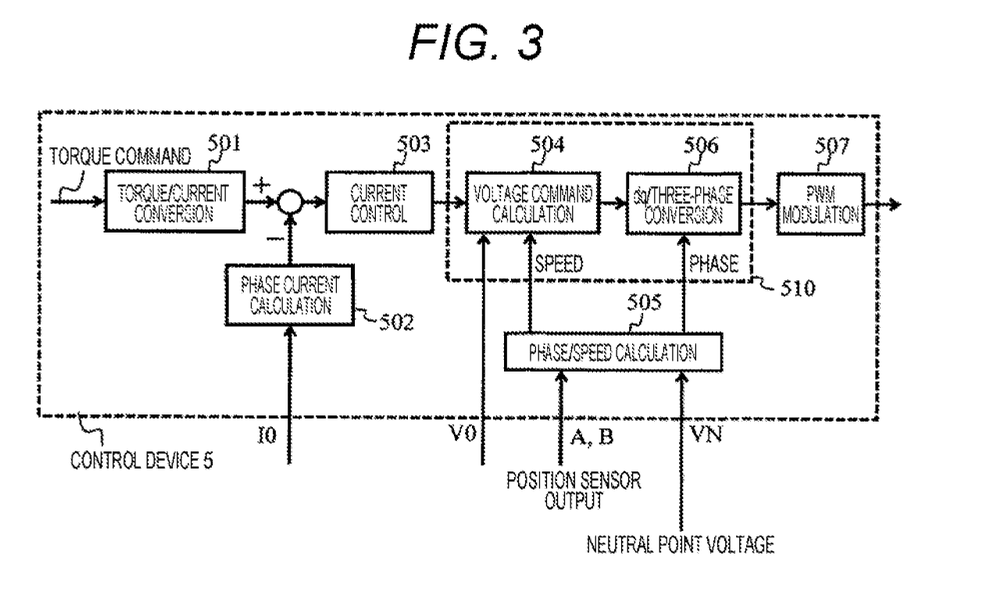
FIG. 3 is a diagram showing a control configuration of a control device.

FIG. 3 shows the configuration of the control device 5. A torque/current converter 501 converts a torque command into a current command. A phase current calculation unit 502 calculates the phase current of the motor 1 from the detection current I0 detected by the DC current detector 4. A current control unit 503 receives the deviation between the output of the torque/current converter 501 and the output of the phase current calculation unit 502, and controls the current so that this deviation is zero. A voltage command calculation unit 504 calculates a voltage command using the output of the current control unit 503, the DC voltage V0, and the speed (motor rotation speed). A dq/three-phase converter 506 obtains three-phase AC commands Vu*, Vv*, and Vw* from the phase based on the position of the rotor and the voltage commands Vd* and Vq* on the d-axis and the q-axis, which are the stator coordinates.

A PWM modulator 507 receives the three-phase AC commands and compares them with the carrier waveform to generate a switching signal for the inverter 2. The voltage command calculation unit 504 and the dq/three-phase converter 506 can be regarded as an applied voltage decision unit 510 that determines the applied voltage driven by the inverter 2. A phase/speed calculation unit 505 determines (calculates) the speed and the phase. Specifically, the phase/speed calculation unit 505 calculates the detection phase from the outputs A and B of the position sensor 6. Further, the phase/speed calculation unit 505 retrieves the estimated phase from the neutral point voltage VN using a map showing the correspondence relationship between the neutral point voltage and the phase, or calculates the estimated phase using an approximate expression. Here, the position, of the rotor, estimated from the neutral point voltage VN of the motor 1 does not depend on the position, of the rotor, detected by the position sensor 6 with the output A (first position sensor) and the position, of the rotor, detected by the position sensor 6 with the output B (second position sensor), because it is obtained not using them. As a result, the position of the rotor (estimated phase) estimated from the neutral point voltage VN of the motor 1 is not affected by the failure of the position sensor 6. The map is created in advance from the results of the experiment or the simulation and is stored in the memory or the like.

Figure 4:
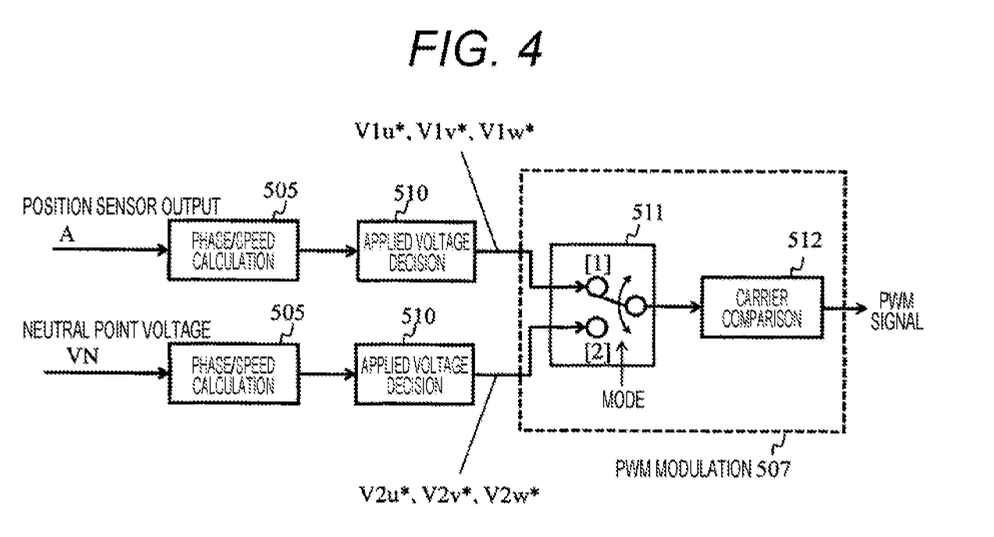
FIG. 4 is a diagram showing details of a PWM modulator.

FIG. 4 shows details of the PWM modulator 507. The phase/speed calculation unit 505 calculates the phase (detection phase) and the speed (detection speed) from the output A of the position sensor 6. The applied voltage decision unit 510 calculates a three-phase AC command from the detection phase and the detection speed to output it as the output [1] to the PWM modulator 507. Further, as parallel processing, the phase/speed calculation unit 505 calculates the phase (estimated phase) and speed (estimated speed) from the neutral point voltage VN. The applied voltage decision unit 510 calculates a three-phase AC command from the estimated phase and the estimated speed to output it as the output [2] to the PWM modulator 507.

In other words, the applied voltage decision unit 510 performs in parallel, a process of determining the three-phase AC commands V1u*, V1v*, and V1w* (first command value) of the voltage applied to the motor 1 by the inverter 2 based on the position, of the rotor of the motor 1, detected by the position sensor 6 with the output A (first position sensor), and a process of determining the three-phase AC commands V2u*, V2v*, and V2w* (second command value) of the voltage applied to the motor 1 by the inverter 2 based on the neutral point voltage VN of the motor 1. Here, the three-phase AC commands (second command value) are not affected by the failure of the position sensor 6 with the output A.

A mode switching unit 511 alternately switches the output [1] and the output [2], for example, every carrier cycle, and inputs them to a carrier comparison unit 512. The carrier comparison unit 512 compares one of the output [1] and the output [2] with the carrier signal to determine a switching signal for driving the inverter 2, and applies a desired voltage as a pulse output to the motor 1 via the inverter 2.

In other words, the PWM modulator 507 (modulator) alternately outputs, to the inverter 2, a PWM signal (first pulse width modulation signal) according to the three-phase AC commands V1u*, V1v*, and V1w* (first command value) and a PWM signal (second pulse width modulation signal) according to the three-phase AC commands V2u*, V2v*, and V2w* (second command value). As a result, the PWM signal based on the detection phase with high resolution and the PWM signal based on the estimated phase with low resolution (second pulse width modulation signal) are alternately output.

Figure 5:
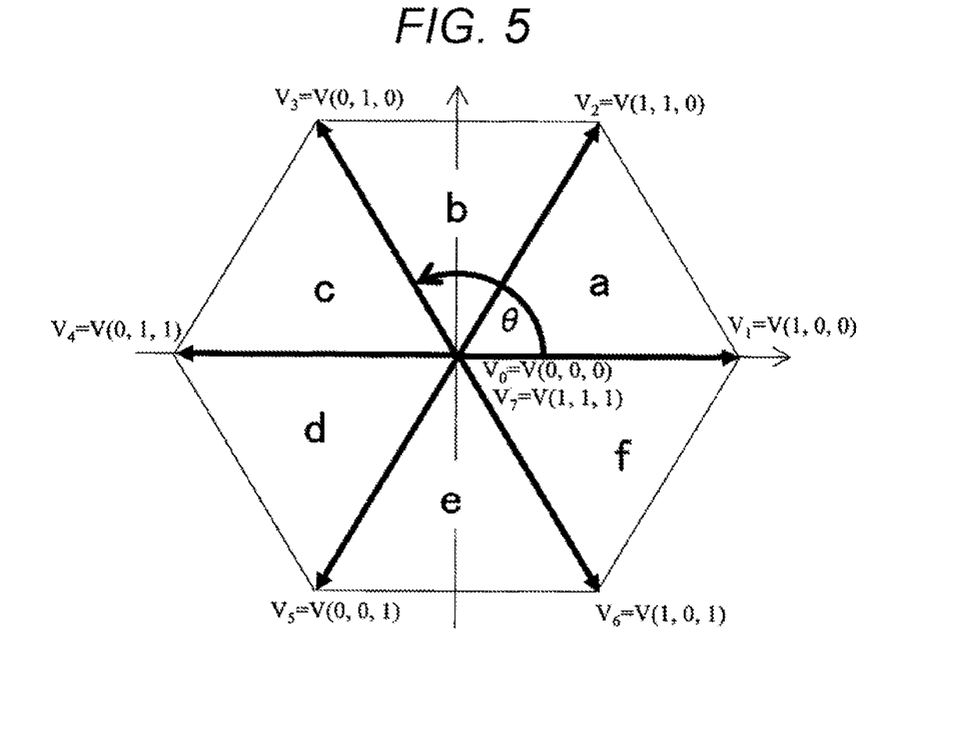
FIG. 5 is a diagram showing an output vector of an inverter.

FIG. 5 shows the relationship between the switching signal and the phase. When the phase θ rotates in the counterclockwise direction, the voltage applied to the inverter 2 is determined by the combination of the energization vectors V1, V2, V3, V4, V5, and V6 indicated by the arrows for every 60 degrees, and V0 and V7, which are the zero vectors of the origin. The areas indicated by the total vectors obtained by the combination are illustrated as energization vector areas a to f. Each voltage vector represents the state of each arm as a switching mode in which "1" indicates the upper arm turns on and "0" indicates the lower arm turns on. For example, V1 in FIG. 4 indicates a switching mode in which (1, 0, 0) is set in the order of (U, V, and W). When the phase θ is different, the voltage is applied to the inverter 2 in different conduction modes.

Figure 6:
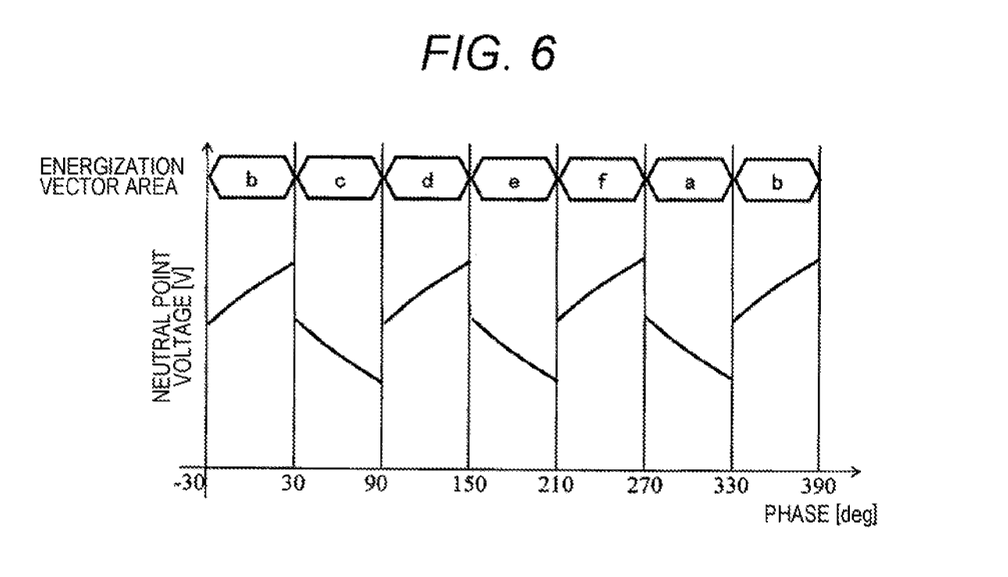
FIG. 6 is a diagram showing a relationship between a neutral point voltage and a phase.

FIG. 6 shows the relationship between the neutral point voltage and the phase. The neutral point voltage switches every 60 degrees with respect to the energization vector areas a to f, and has a position dependency with respect to the phase. By utilizing the position dependency of the neutral point voltage, the phase can be estimated by calculating backward the phase with a map or an arithmetic expression (approximate expression). For example, the phase/speed calculation unit 505 preliminarily prepares the map of FIG. 6 for each energization vector area, and estimates the phase in comparison with the detected neutral point voltage VN.

The neutral point voltage shown in FIG. 6 is obtained by energizing the motor 1 and does not depend on the rotation speed, so that it is possible to perform the position estimation from the zero speed and the extremely low speed rotation. Also, since similar characteristics can be obtained in the middle and high speed rotation range, it is possible to estimate the phase in all speed ranges, but in general, it is easy to obtain the induced voltage of the motor 1 at the medium and high speed rotations, so that it is easier to perform the position estimation based on the induced voltage.

Therefore, it is desirable that the threshold value be set to about 10% of the rated speed at which it is difficult to perform the position estimation by the induced voltage, and the position estimation based on the neutral point voltage be performed in a range equal to or less than the threshold value. Here, when the rotation speed of the motor 1 is less than or equal to a predetermined rotation speed, the applied voltage decision unit 510 determines, based on the neutral point voltage VN of the motor 1, the second command value of the voltage applied to the motor 1 by the inverter 2. As a result, only when it is difficult to estimate the position (phase) based on the induced voltage, it is possible to determine the three-phase AC commands $V2u^*$, $V2v^*$, and $V2w^*$ (second command value) from the estimated phase based on the neutral point voltage VN of the motor 1.

Figure 7:
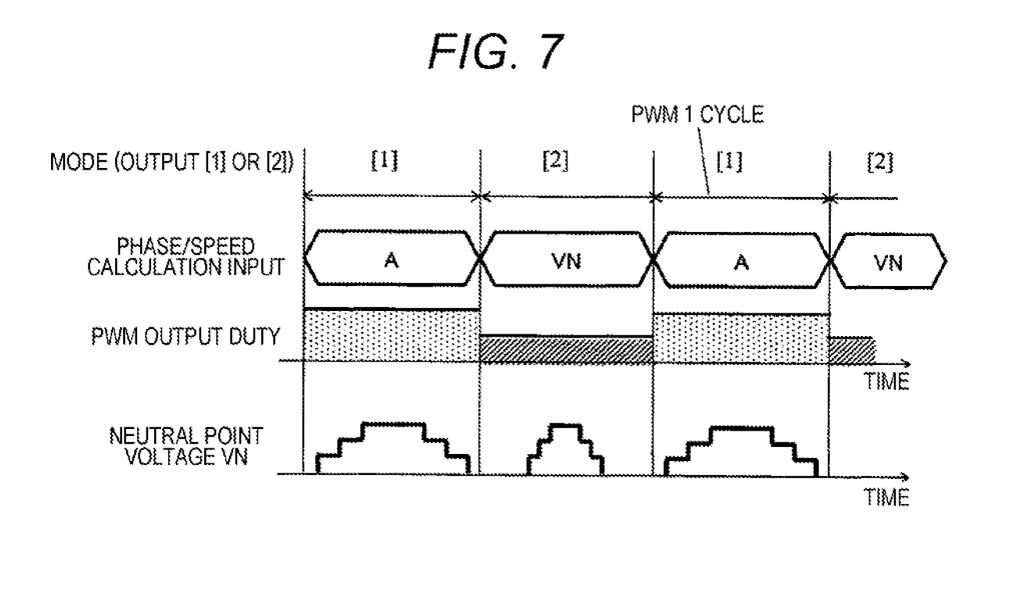
FIG. 7 is a diagram showing a duty waveform of a PWM output and a waveform of a neutral point voltage.

FIG. 7 shows an example of the waveform of the neutral point voltage VN obtained by applying the duty waveform of the PWM output, which is switched every PWM carrier cycle by the mode switching unit 511. The duty of the output [1] and the output [2] changes depending on the input of the phase/speed calculation unit 505. Here, the neutral point voltage VN obtained by applying the voltage with the duty of the output [2] is detected, and the PWM output duty is calculated again using the detection result.

In this way, by dividing the estimated phase obtained from the neutral point voltage VN, and the detection phase obtained from the position sensor for the PWM output period, the loop for calculating the voltage applied to the inverter 2 can be separated. With such a configuration, when the position sensor output A of the position sensor 6 has an error due to a failure, the energization vector area may be different from the true phase.

In this case, as shown in FIG. 6, the neutral point voltage has position-dependent characteristics that change every 60 degrees, so that there is a problem that the accurate position estimation cannot be performed in the energization vector area based on the position sensor output A which has an error due to a failure. Therefore, according to this embodiment, by separating the detection phase of the position sensor output A and the estimated phase from the neutral point voltage VN, it is possible to accurately calculate the estimated phase from the neutral point voltage VN even when the position sensor output A has failed.

As it is possible to calculate the estimated phase accurately, the estimated phase from the neutral point voltage VN is compared with the output A and the output B when the outputs A and B of the position sensor 6 are compared and they are different, and it is possible to identify as the failure output any, of the two outputs, that exceeds the predetermined threshold value. After identifying the failure output, it is possible to continue the operation using the non-failure output.

In other words, when the difference between a position, of the rotor, detected by the position sensor 6 with the output A (first position sensor) and a position, of the rotor, detected by the position sensor 6 with the output B (second position sensor) exceeds the threshold value, the control device 5 functions as a determination unit that compares the position, of the rotor, detected by the position sensor 6 with the output A with the position, of the rotor, estimated from the neutral point voltage VN of the motor 1 to determine whether or not the position sensor 6 with the output A has failed, and compares the position, of the rotor, detected by the position sensor 6 with the output B with the position, of the rotor, estimated from the neutral point voltage VN of the motor 1 to determines whether or not the position sensor 6 with the output B has failed. As a result, when the two detection phases are different, the position sensor 6 that has failed can be identified. The position sensor 6 with the output B may be considered as the first position sensor, and the position sensor 6 with the output A may be considered as the second position sensor.

The control device 5 may function only as a determination unit that determines whether or not the position sensor 6 with the output A has failed by comparing the position, of the rotor, detected by the position sensor 6 with the output A (first position sensor) with the position, of the rotor, estimated from the neutral point voltage VN of the motor 1. The position sensor 6 with the output B may be considered as the first position sensor.

Since the position sensor has an output with a generally high resolution, when the output A is a failure output, it is desirable to use the position sensor output A, the position sensor output B, and the estimated phase by the neutral point voltage VN in this order.

Also, when the arrangement of the layout with the highest position detection accuracy is set as the condition for the output A, and the communication means with the smallest time delay is applied, the detection phase with a highest detection accuracy and the small delay can be preferentially used. In other words, the position sensor 6 with the output A (first position sensor) is disposed at the position at which the detection accuracy is the highest, and outputs a signal indicating the position of the rotor via a communication medium whose signal transmission delay time is smaller than a threshold value. As a result, it is possible to obtain stable and excellent drive characteristics in which the torque ripple is suppressed, for example.

As described above, according to the present embodiment, it is possible to determine the failure of the position sensor using the neutral point voltage of the motor.

Here, in the present embodiment, the torque of the motor is controlled by the PWM signal (first pulse width modulation signal) based on the output A of the position sensor 6. That is, the shortage of the torque of the motor 1 based on the PWM signal (second pulse width modulation signal) based on the neutral point voltage VN of the motor 1 is controlled by correcting the PWM signal (first pulse width modulation signal) based on the output A of the position sensor 6. As a result, the torque of the motor 1 is controlled based on the output A of the high-resolution position sensor 6.

Second Embodiment

Figure 8:
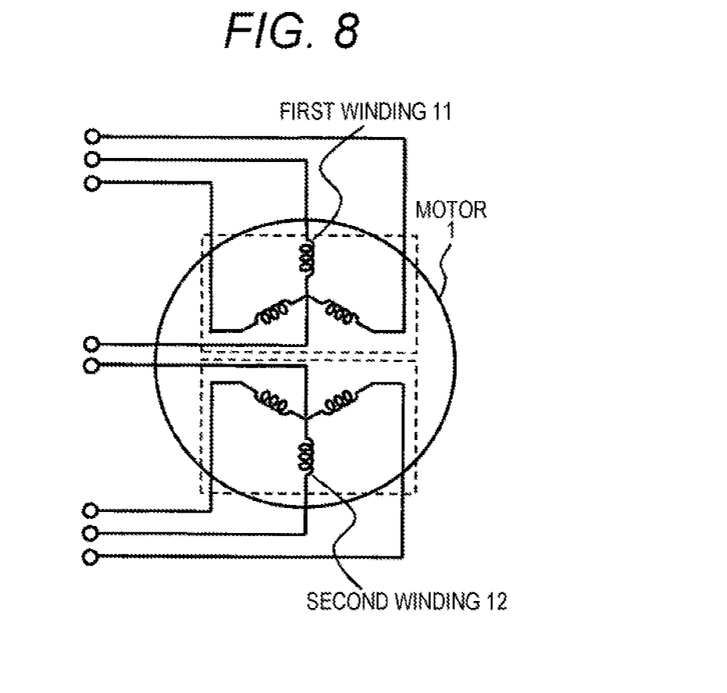
FIG. 8 is a configuration diagram of a two-system motor according to a second embodiment.

FIG. 8 shows the motor 1 in the case of two systems. The motor 1 of FIG. 1 has one system configuration in which the inverter 2 is connected to a three-phase winding in one-to-one. The same applies for two systems . . . N systems as in two to two . . . N to N, respectively, and FIG. 8 shows an example of two systems.

The motor 1 has two independent windings, which are a first winding 11 and a second winding 12, and has magnetic circuits that share one rotor via the stator of the motor 1. Having a plurality of systems enables continuous operation even when the inverter 2 fails.

Although not shown, the position sensor 6 may have N position sensor outputs. When the number is N, it is easy to identify the failure output by comparing with each other.

Further, the motor is not affected by the common failure factor of the position sensor in comparison with the estimated phase based on the neutral point voltage VN, so that it is possible to identify the failure output more accurately.

Third Embodiment

Figure 9:
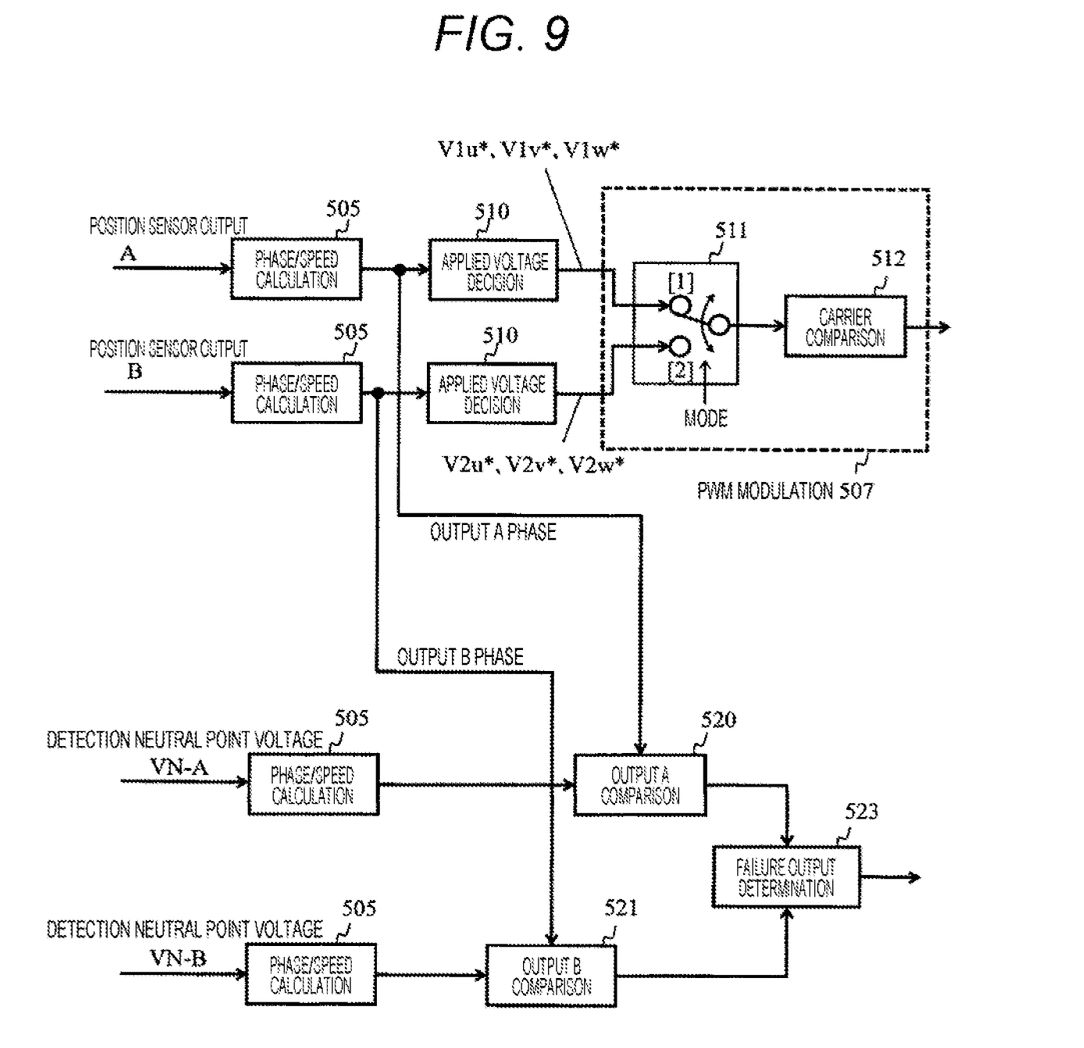
FIG. 9 is a configuration diagram of a third embodiment.

FIG. 9 shows an example of using the output A, and the output B as an example of the position sensor output other than the output A of the outputs of the position sensor 6. In this embodiment, the applied voltage decision unit 510 determines, based on the position, of the rotor, detected by the position sensor 6 with the output B (second position sensor), the three-phase AC commands V2u*, V2v*, and V2w* (second command value). Thus, the three-phase AC commands (second command value) are determined based on the output B of the high-resolution position sensor 6.

Figure 10:
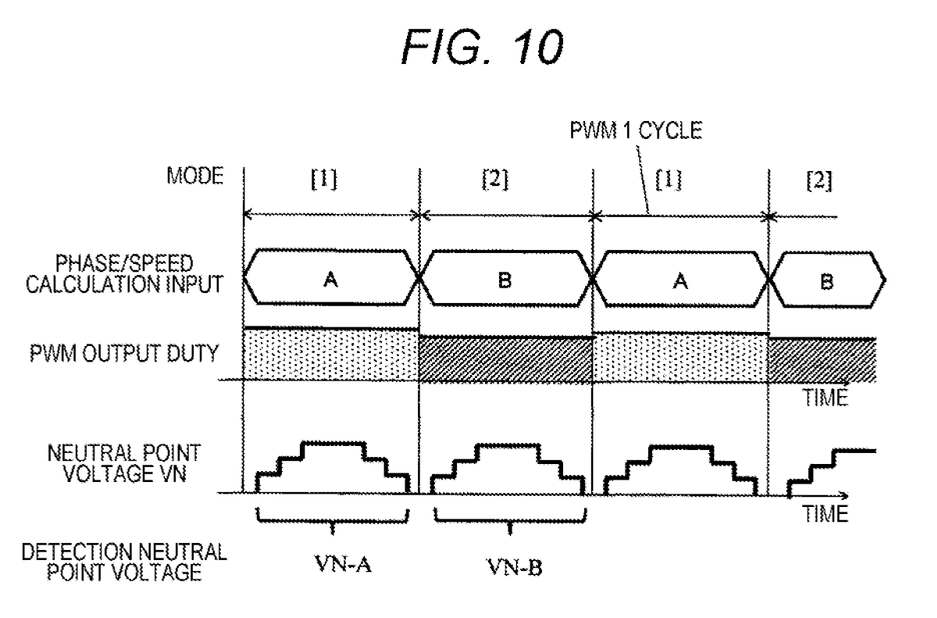
FIG. 10 is a diagram showing a duty waveform of a PWM output and a waveform of a neutral point voltage according to the third embodiment.

Even when the output B is used, the calculation with the output A is separated as in the case where the neutral point voltage VN of FIG. 4 is input. FIG. 10 shows an example of a waveform switched by the mode switching unit 511 every PWM carrier cycle. The detection neutral point voltage obtained at the output [1] is VN-A, and the detection neutral point voltage obtained at the output [2] is VN-B. An output A comparison unit 520 compares the phase estimated from VN-A with the detection phase of the output A to output the difference therebetween. Similarly, an output B comparison unit 521 outputs the difference obtained by comparing the estimated phase of VN-B with the detection phase of the output B. A failure output determination unit 523 compares both outputs of the output A comparison unit 520 and the output B comparison unit 521, and determines that the output that exceeds the predetermined threshold value and has a larger difference is the failure output.

For example, when it is determined that the position sensor 6 with the output A (first position sensor) has failed, the applied voltage decision unit 510 determines the first command value based on the position, of the rotor, detected by the position sensor 6 with the output B (second position sensor). As a result, the control of the inverter 2 and the driving of the motor 1 can be continued. Further, when the difference between the position, of the rotor, detected by the position sensor 6 with the output B and the position, of the rotor, estimated from the neutral point voltage VN of the motor 1 exceeds a threshold value, the control device 5 may function as a determination unit that determines that the position sensor 6 with the output B has failed. As a result, it is possible to identify the failure of the position sensor 6 with the output B.

Further, when the first difference between the position, of the rotor, detected by the position sensor 6 with the output A (first position sensor) and the position, of the rotor, estimated from the neutral point voltage VN of the motor 1 is greater than the second difference between the position, of the rotor, detected by the position sensor 6 with the output B (second position sensor) and the position, of the rotor, estimated from the neutral point voltage VN of the motor 1, the control device 5 (determination unit) may determine that the position sensor 6 with the output A has failed, and when the first difference is less than the second difference, it may determine that the position sensor 6 with the output B (second position sensor) has failed. Thereby, the position sensor 6 that has failed can be identified based on the deviation from the estimated phase.

According to the present embodiment, it is possible to realize a highly accurate drive using the position sensor output and identify the failure output to continue the operation.

Here, the torque of the motor 1 is controlled by the PWM signal (second pulse width modulation signal) based on the output B of the position sensor 6. That is, the torque shortage of the motor 1 based on the PWM signal based on the output B of the position sensor 6 is controlled by correcting the PWM signal based on the output B (second pulse width modulation signal). As a result, the torque of the motor 1 is controlled based on the output B of the high-resolution position sensor 6.

The present invention is not limited to the embodiments described above, but includes various modifications. For example, the above-described embodiments have been described in detail for easy understanding of the present invention, and the present invention is not necessarily limited to embodiments having all the configurations described. Moreover, it is possible to replace part of the configuration of an embodiment with the configuration of another embodiment, and it is also possible to add the configuration of another embodiment to the configuration of an embodiment. Further, it is possible to add, delete, and replace another configuration with respect to part of the configuration of each embodiment.

Further, part or all of the above-described respective configurations, functions (means) and the like may be realized by hardware, for example, by designing them with an integrated circuit. Further, the above-described respective configurations, functions (means), and the like may be realized by software with the processor interpreting and executing programs for realizing the respective functions. Information such as programs, tables, and files that implement each function is stored in memory and it can be placed in a recording device such as a hard disk or a solid state drive (SSD), or a recording medium such as an IC card, an SD card, or a DVD.

In addition, the embodiment of the present invention may be the following aspects.

(1). In an electric power conversion device including an inverter that converts a direct current to an alternate current, and a motor driven by the inverter, where the electric power conversion device outputs an AC output of the inverter in pulses determined by a pulse width modulation based on either outputs of two or more position sensors that independently detect a position of a rotor of a motor, or an output of a position estimation unit that detects a neutral point voltage of the motor to estimate the position of the rotor, the electric power conversion device outputs alternately, in the pulses of the AC output, a first pulse based on a first output of the position sensor outputs, and a second pulse based on an output other than the first output of the position sensor outputs, and performs an abnormality determination by comparing an output of the position estimation unit obtained by detecting a neutral point voltage of the motor of the second pulse with the position sensor outputs.

(2). In the electric power conversion device described in (1), the output of the position estimation unit is used for the second pulse.

(3). In the electric power conversion device described in (2), the abnormality determination of the position sensor is performed so that when the result obtained by comparing the first output and the output other than the first output of the position sensors exceeds a predetermined threshold value, the output of the position sensor when the differences obtained by comparing the first and second outputs of the position sensors with respect to the output of the position estimation unit exceeds the respective threshold values is determined to be abnormal.

(4). In the electric power conversion device described in (3), the output of the position estimation unit does not use a calculation result based on the output of the position sensor.

(5). The electric power conversion device described in (2), the first pulse is a control output for controlling the torque of the motor.

(6). In the electric power conversion device described in (5), in the second pulse, the pulse based on a control output suitable for position estimation calculated based on the output of the position estimation unit is output, and the difference between a control output for controlling the torque of the first pulse, and a control output of the second pulse is a first pulse correction output that is an output obtained by correcting the first pulse.

(7). In the electric power conversion device described in (2), the first output of the position sensor is communication means with the arrangement with a highest detection accuracy and with the smallest signal transmission delay time with respect to the output other than the first output of a position sensor.

(8). The electric power conversion device described in (1), an output other than the first output of the position sensor is used for the second pulse.

(9). In the electric power conversion device described in (8), the first pulse is a control output for controlling the torque of the motor based on the output other than the first output of the position sensor.

(10). In the electric power conversion device described in (8), when the first output of the position sensor fails, the output other than the first output of the position sensor is used.

(11). In the electric power conversion device described in (10), when the result obtained by comparing the output of the position estimation unit and the output other than the first output of the position sensor exceeds a predetermined threshold value, it is determined that the output other than the first output of the position sensor is abnormal.

(12). In the electric power conversion device described in (8), the failure determination of the position sensor is performed so that a first difference is set as a difference obtained by comparing the first output of the position sensor with the output of the position estimation unit obtained by detecting the neutral point voltage of the motor generated by the first pulse based on the output, a second difference is set as a difference obtained by comparing the output other than the first output of the position sensor with the output of the position estimation unit obtained by detecting the neutral point voltage of the motor generated by the second pulse based on the output, the first difference and the second difference are compared, and it is determined that the output of the position sensor whose combination has a larger difference has failed.

(13). In the electric power conversion device described in (1), (2), and (8), the second pulse is performed when the rotation speed of the motor is equal to or lower than a predetermined rotation speed.

According to the above (1) to (13), it is possible to identify the failure output of a position sensor of the electric power conversion device, and continue driving the inverter using the output of a position sensor that has not failed.

REFERENCE SIGNS LIST 1 motor
2 inverter
3 DC voltage power supply
4 DC current detector
5 control device
6 position sensor
11 first winding
12 second winding
501 torque/current converter
502 phase current calculation unit
503 current control unit
504 voltage command calculation unit
505 speed calculation unit
506 dq/three-phase converter
507 PWM modulator
510 applied voltage decision unit
511 mode switching unit
512 carrier comparison unit
520 comparison unit
521 comparison unit
523 failure output determination unit

The invention claimed is:

1. A control device comprising:
an applied voltage decision unit that performs in parallel a process of determining, based on a position, of a rotor of a motor, detected by a first position sensor, a first command value of a voltage applied to the motor by an inverter, and a process of determining, based on a position, of the rotor, detected by a second position sensor or a neutral point voltage of the motor, a second command value of a voltage applied to the motor by the inverter;
a modulator that alternately outputs, to the inverter, a first pulse width modulation signal according to the first command value and a second pulse width modulation signal according to the second command value; and
a determination unit that determines whether or not the first position sensor has failed by comparing the position, of the rotor, detected by the first position sensor with a position, of the rotor, estimated from the neutral point voltage of the motor, wherein
the applied voltage decision unit determines the second command value based on a neutral point voltage of the motor, and
when a difference between a position, of the rotor, detected by the first position sensor and a position, of the rotor, detected by the second position sensor exceeds a threshold value, the determination unit determines whether or not the first position sensor has failed by comparing the position, of the rotor, detected by the first position sensor with the position, of the rotor, estimated from the neutral point voltage of the motor, and determines whether or not the second position sensor has failed by comparing the position, of the rotor, detected by the second position sensor with the position, of the rotor, estimated from the neutral point voltage of the motor.

2. The control device according to claim 1, wherein a position, of the rotor, estimated from the neutral point voltage of the motor is independent of a position, of the rotor, detected by the first position sensor and a position, of the rotor, detected by the second position sensor.

3. The control device according to claim 1, wherein a torque of the motor is controlled by the first pulse width modulation signal.

4. The control device according to claim 1, wherein the first position sensor is disposed at a position with a highest detection accuracy, and outputs a signal indicating a position of the rotor via a communication medium whose signal transmission delay time is smaller than a threshold value.

5. The control device according to claim 1, wherein the applied voltage decision unit determines the second command value based on a position, of the rotor, detected by the second position sensor.

6. The control device according to claim 5, wherein a torque of the motor is controlled by the second pulse width modulation signal.

7. The control device according to claim 5, wherein when it is determined that the first position sensor has failed, the applied voltage decision unit determines the first command value based on a position, of the rotor, detected by the second position sensor.

8. The control device according to claim 5, wherein the determination unit determines that the first position sensor has failed when a first difference between a position, of the rotor, detected by the first position sensor and a position, of the rotor, estimated from the neutral point voltage of the motor is greater than a second difference between a position, of the rotor, detected by the second position sensor and a position, of the rotor, estimated from a neutral point voltage of the motor, and determines that the second position sensor has failed when the first difference is less than the second difference.

9. The control device according to claim 1, wherein the applied voltage decision unit determines a second command value of a voltage applied to the motor by the inverter based on a neutral point voltage of the motor when a rotation speed of the motor is equal to or lower than a predetermined rotation speed.

10. A control device comprising:
an applied voltage decision unit that performs in parallel a process of determining, based on a position, of a rotor of a motor, detected by a first position sensor, a first command value of a voltage applied to the motor by an inverter, and a process of determining, based on a position, of the rotor, detected by a second position sensor or a neutral point voltage of the motor, a second command value of a voltage applied to the motor by the inverter;
a modulator that alternately outputs, to the inverter, a first pulse width modulation signal according to the first command value and a second pulse width modulation signal according to the second command value; and
a determination unit that determines whether or not the first position sensor has failed by comparing the position, of the rotor, detected by the first position sensor with a position, of the rotor, estimated from the neutral point voltage of the motor, wherein
the applied voltage decision unit determines the second command value based on a neutral point voltage of the motor,
a torque of the motor is controlled by the first pulse width modulation signal, and
a shortage of a torque of the motor based on the second pulse width modulation signal is controlled by correcting the first pulse width modulation signal.

11. A control device comprising:
an applied voltage decision unit that performs in parallel a process of determining, based on a position, of a rotor of a motor, detected by a first position sensor, a first command value of a voltage applied to the motor by an inverter, and a process of determining, based on a position, of the rotor, detected by a second position sensor or a neutral point voltage of the motor, a second command value of a voltage applied to the motor by the inverter;
a modulator that alternately outputs, to the inverter, a first pulse width modulation signal according to the first command value and a second pulse width modulation signal according to the second command value; and
a determination unit that determines whether or not the first position sensor has failed by comparing the position, of the rotor, detected by the first position sensor with a position, of the rotor, estimated from the neutral point voltage of the motor, wherein
the applied voltage decision unit determines the second command value based on a position, of the rotor, detected by the second position sensor,
when it is determined that the first position sensor has failed, the applied voltage decision unit determines the first command value based on a position, of the rotor, detected by the second position sensor, and
when a difference between a position, of the rotor, detected by the second position sensor and a position, of the rotor, estimated from the neutral point voltage of the motor exceeds a threshold value, the determination unit determines that the second position sensor has failed.

* * * * *